(12) United States Patent
Walgenbach

(10) Patent No.: US 9,312,666 B1
(45) Date of Patent: Apr. 12, 2016

(54) PANELBOARD/CIRCUIT BREAKER BARRIER INTERFACE

(71) Applicant: SCHNEIDER ELECTRIC USA, INC., Palatine, IL (US)

(72) Inventor: Jacob E. Walgenbach, Nashville, TN (US)

(73) Assignee: Schneider Electric USA, Inc., Schaumburg, IL (US)

( * ) Notice: Subject to any disclaimer, the term of this patent is extended or adjusted under 35 U.S.C. 154(b) by 0 days.

(21) Appl. No.: 14/582,145

(22) Filed: Dec. 23, 2014

(51) Int. Cl.
*H02B 1/04* (2006.01)
*H02B 1/06* (2006.01)

(52) U.S. Cl.
CPC ... *H02B 1/04* (2013.01); *H02B 1/06* (2013.01)

(58) Field of Classification Search
USPC ............... 361/631, 635–636, 653–654, 656
See application file for complete search history.

(56) References Cited

U.S. PATENT DOCUMENTS

| | | | | |
|---|---|---|---|---|
| 2,737,613 A * | 3/1956 | Morris | ................... | H02B 1/056 174/99 B |
| 2,928,998 A * | 3/1960 | Brumfield | ............ | H01R 13/645 200/293 |
| 2,986,676 A * | 5/1961 | Edmunds | ............... | H02B 1/056 200/293 |
| 3,325,693 A * | 6/1967 | Stanback | ............... | H02B 1/056 361/635 |
| 3,541,397 A * | 11/1970 | Kobryner | ............... | H02B 1/056 361/635 |
| 5,134,543 A * | 7/1992 | Sharp | ...................... | H02B 1/40 361/644 |
| 5,272,591 A * | 12/1993 | Blue | ........................ | H02B 1/06 361/622 |
| 5,761,026 A * | 6/1998 | Robinson | ............... | H02B 1/056 200/303 |
| 8,625,257 B2 * | 1/2014 | Schalk | .................. | H02B 1/056 361/637 |
| 2011/0176258 A1 * | 7/2011 | Creighton | .............. | H02B 1/056 361/642 |

* cited by examiner

*Primary Examiner* — Gregory Thompson
(74) *Attorney, Agent, or Firm* — Locke Lord LLP

(57) ABSTRACT

Methods and systems for safely installing and removing a circuit breaker or other branch electrical equipment from a panelboard provide a resilient barrier interface for the panelboard. The barrier interface operates in conjunction with the circuit breaker to allow access to a plug-in jaw in the panelboard only when the circuit breaker is inserted in the panelboard. Specifically, the circuit breaker has one or more insertion keys on the underside of its casing that interact with the barrier interface to open and close the barrier interface. When the circuit breaker is inserted into the panelboard, the insertion keys force the barrier interface open automatically to allow the circuit breaker to access the plug-in jaw. Removing the circuit breaker from the panelboard automatically closes the barrier interface and prevents fingers or tools and the like from inadvertently accessing the plug-in jaw.

13 Claims, 4 Drawing Sheets

PANELBOARD/CIRCUIT BREAKER BARRIER INTERFACE

FIELD OF THE INVENTION

The present disclosure relates to methods and systems for installing and removing a circuit breaker from an electrical panel or panelboard, and more particularly to a method and system for reducing the chances of exposure to live parts in the panelboard.

BACKGROUND OF THE INVENTION

An electrical panel or panelboard has a main bus and individual connection points on the bus that are connectable to electrical devices, such as circuit breakers for branch conductors and any other electrical devices designed to be installed for a branch circuit. Because the circuit breakers and other branch electrical devices are typically mounted directly to the panelboard, an operator and/or tools may come in contact with exposed conductors in the panelboard when installing or removing the circuit breakers from the panelboard. Thus, it is recommended that power be shut off to the panelboard as a precaution when electrical devices are being installed or removed. However, it may be considered desirable in some cases to keep the panelboard energized to prevent an electrical hazard as a consequence of deenergization, or operators may intentionally keep the power on in the interest of saving time. Moreover, shutting off power to the panelboard can be a major inconvenience, especially for data centers, hospitals, and other critical applications that require a high availability power source.

Thus, a need exists for an improved way to safely install and remove a circuit breaker or other branch electrical devices from an electrical panel as part of a larger scheme for installing and removing branch circuit devices without deenergizing the electrical panel.

SUMMARY OF THE DISCLOSED EMBODIMENTS

The embodiments disclosed herein are directed to methods and systems for reducing the chances of exposure to live parts in a panelboard and safely installing and removing a circuit breaker or other branch electrical devices from the panelboard. The disclosed embodiments provide a barrier interface that is attachable to the panelboard in a circuit breaker mounting slot of the panelboard. The barrier interface operates in conjunction with the circuit breaker or other branch electrical device to allow access to a plug-in jaw in the panelboard only when the electrical device is inserted in the panelboard. Each plug-in jaw in the panelboard may have a separate barrier interface, or several plug-in jaws may share the same barrier interface. The circuit breaker or other electrical device may then be inserted in the barrier interface to connect a stab or other terminal to the plug-in jaw. Specifically, the circuit breaker has one or more insertion keys on the underside of its casing that automatically force open the barrier interface to allow a stab or other terminal to contact the plug-in jaw. Removing the circuit breaker from the panelboard automatically closes the barrier interface and prevents fingers or tools and the like from inadvertently accessing the plug-in jaw. Such a barrier interface reduces the chances of exposure to live parts in the panelboard.

In some implementations, the barrier interface may be composed of two opposing frames coupled to one another to form a protective housing around the plug-in jaw. The two opposing frames may be made mostly or entirely of a non-conductive plastic or other material that has a resilient or spring like characteristic. The resilient or spring like characteristic allows the frames to return substantially to their original form after being flexed or deformed. Each frame includes a base, two nearly identical risers extending substantially perpendicularly from the base on opposite sides thereof, and a guard beam resembling a horizontal bar connecting the ends of the risers together. This arrangement gives each frame a substantially rectangular shape and sufficient size to enclose the plug-in jaw when the frames are coupled together. Each base has a coupling mechanism that couples or otherwise joins one base to the other while the guard beams are free to move by virtue of the flexibility or resiliency of the material used for the frames.

Each frame also has a shield plate near the middle of the guard beam that extends toward the opposing frame, resulting in the shield plate of one frame overlapping the shield plate of the opposing frame when the two frames are coupled to one another. The overlapping shield plates cover and otherwise prevent access to the plug-in jaw in the panelboard when the barrier interface is mounted in the panelboard. To access the plug-in jaw, the guard beams are separated or moved back from each other enough so the shield plates no longer overlap, thus exposing the plug-in jaw in the panelboard.

Separating the guard beams of opposing frames from one another may be accomplished by inserting the circuit breaker in the barrier interface. As mentioned above, the circuit breaker has one or more stabs or other terminals along with one or more insertion keys on the underside of its casing. Each stab or other terminal is flanked on at least one side by one of the insertion keys, which may be the same size as, but preferably thicker and longer than, the terminal. The insertion keys essentially run interference through the barrier interface for the terminal, opening the way to the plug-in jaw for the terminal. To this end, the insertion keys may be positioned on the circuit breaker such that when the circuit breaker is inserted in the barrier interface, the keys line up in between the guard beams of the opposing frames. As the circuit breaker is inserted in the barrier interface, the insertion keys pry apart the guard beams and separate the shield plates, allowing the terminal to pass through the barrier interface to the plug-in jaw in the panelboard.

In some implementations, the guard beams may be provided with rounded or sloped engagement surfaces to facilitate insertion of the circuit breaker. The rounded or sloped engagement surface may be in the form of semi-cylindrical protrusions provided on each guard beam near each end thereof above the risers where the insertion keys typically contact the guard beams. The semi-cylindrical protrusions may extend in the same direction as the shield plates so the protrusion on one guard beam abuts or almost touches the protrusion on the other guard beam when the frames are coupled together. These semi-cylindrical protrusions make it easier for the insertion keys to slip between the guard beams.

In general operation, the motion of inserting the circuit breaker (which is preferably off) into the panelboard pushes the keys on the circuit breaker between opposing engagement surfaces and forces the guard beams apart. As the guard beams separate, they move the shield plates away from one another so the plates no longer overlap, allowing the terminal of the circuit breaker to contact and enter the plug-in jaw. Removing the circuit breaker (which is preferably off) from the panelboard allows the guard beams and the shield plates to spring back together due to the resiliency of the frames.

In some implementations, the one or more keys may resemble legs on the underside of the circuit breaker casing and are not conductive and cannot inadvertently carry current. In some implementations, the panelboard may include a panel cover with holes strategically positioned to ensure correct alignment of the insertion keys and stab or other terminal of the circuit breaker in the barrier interface. In some implementations, each barrier interface may include a side cover for blocking access to the sides of the plug-in jaw. In some implementations, a latch or other coupling mechanism may be provided on the frames to help hold the bases to one another when the frames are joined together. As well, in some implementations, a spring or other biasing mechanism may be provided on each frame to help return the frame to its original shape after being flexed or deformed.

In general, in one aspect, the disclosed embodiments are directed to a safety system for an electrical panelboard. The safety system comprises, among other things, a plug-in jaw in the panelboard, the plug-in jaw electrically connected to conductors in the panelboard. The safety system also comprises a barrier interface disposed over the plug-in jaw, the barrier interface operable to allow access to the plug-in jaw when the barrier interface is open and to block access to the plug-in jaw when the barrier interface is closed. The safety system further comprises a circuit breaker having a terminal that is pluggable in the plug-in jaw and one or more insertion keys extending parallel to the terminal, the one or more insertion keys positioned on the circuit breaker to force the barrier interface open when the circuit breaker is inserted in the panelboard.

In general, in another aspect, the disclosed embodiments are directed to a safety system for an electrical panelboard. The safety system comprises, among other things, a connector site in the panelboard, the connector site electrically connected to conductors in the panelboard. The safety system also comprises a barrier interface disposed over the connector site, the barrier interface operable to allow access to the connector site when the barrier interface is open and to block access to the connector site when the barrier interface is closed. The safety system further comprises a circuit breaker having a terminal that is connectable at the connector site and one or more insertion keys extending parallel to the terminal, the one or more insertion keys positioned on the circuit breaker to force the barrier interface open when the circuit breaker is inserted in the panelboard.

BRIEF DESCRIPTION OF THE DRAWINGS

The foregoing and other advantages of the disclosed embodiments will become apparent upon reading the following detailed description and upon reference to the drawings, wherein.

DETAILED DESCRIPTION OF THE DISCLOSED EMBODIMENTS

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Figure 1:
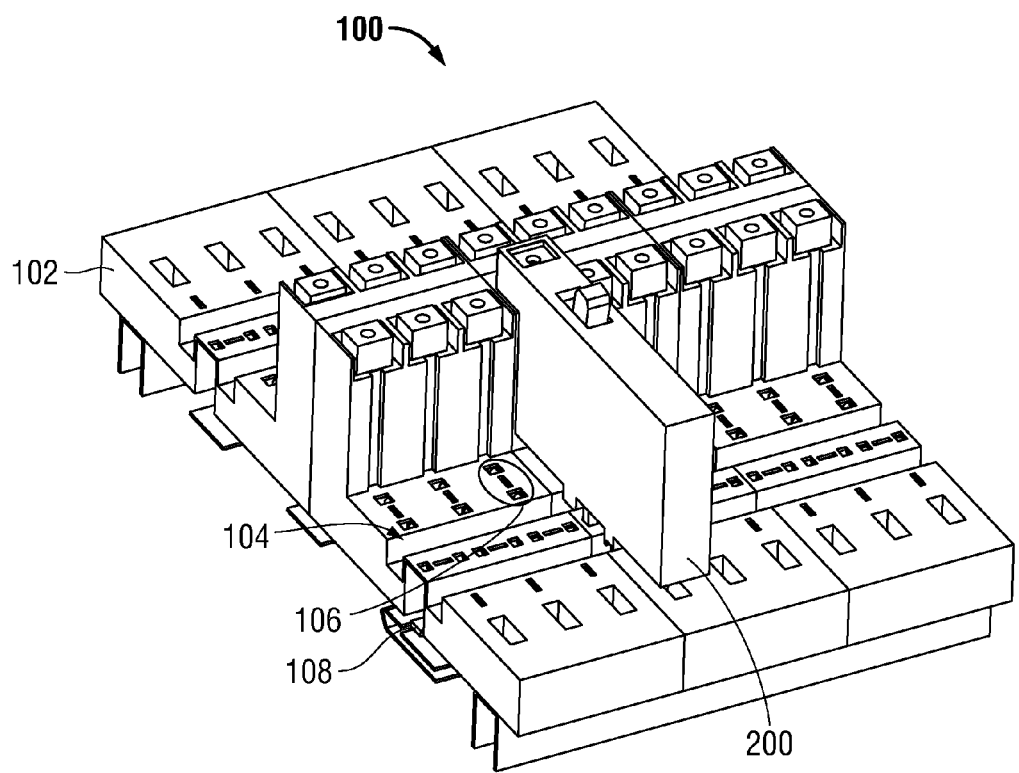
FIG. 1 is an exemplary panelboard in which a barrier interface according to one or more embodiments disclosed herein may be used.

Referring now to FIG. 1, a panelboard 100 is shown according to one or more disclosed embodiments. The panelboard 100 has a panel cover 104 on which several device slots are defined, one of which is indicated at 104, as a space for connecting a circuit breaker 200 or other branch electrical device to the panelboard 100. Each device slot 104 in the panel cover 102 includes a series of openings, generally indicated at 106, that provide access to conductors, one of which is indicated at 108, in the panelboard 100. A circuit breaker 200 or other branch electrical device may then be installed in one of the device slots 104 by inserting the terminals of the circuit breaker 200 in the openings 106. The circuit breaker 200 preferably has male terminals or stabs, but female terminals (e.g., plug-on jaws) may certainly be used without departing from the scope of the disclosed embodiments. In conjunction with female terminals for the circuit breaker, the presently illustrated plug-in jaw connector sites of the panelboard conductors would then preferably be changed to male stab connector sites so as to be easily connectable with the female terminals.

Figure 2:
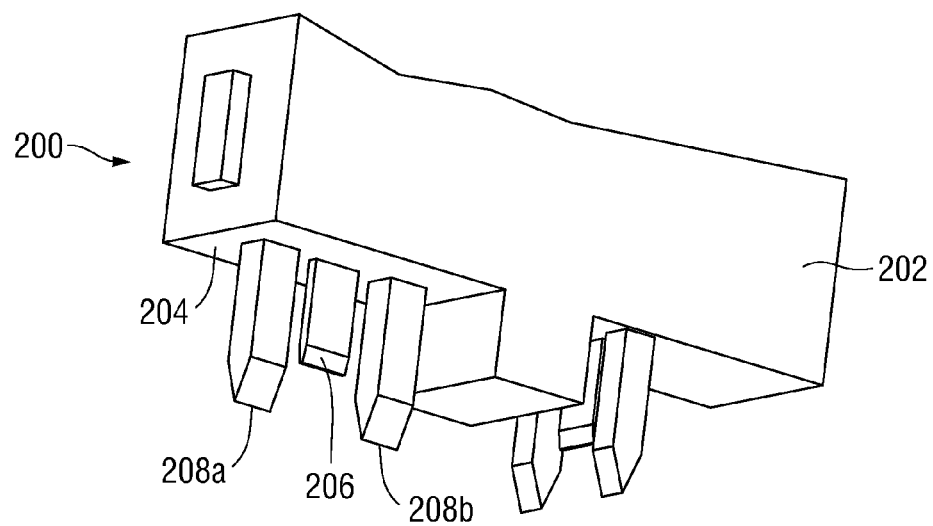
FIG. 2 is an exemplary circuit breaker that may be used with a barrier interface according to one or more embodiments disclosed herein.

An example of the circuit breaker 200 that may be used with the panelboard 100 is depicted in FIG. 2. As can be seen, the exemplary circuit breaker 200 includes an outer casing 202 having a bottom surface 204 from which a stab 206 or other terminal of the circuit breaker 200 may protrude. One or more insertion keys 208a and 208b also protrude from the bottom surface 204 of the casing 202 on either side of the stab substantially parallel to the stab. For safety purposes, the insertion keys 208a, 208b are made of a nonconductive material and thus cannot inadvertently carry current. As well, the insertion keys 208a, 208b may be the same size as, or they may be thicker and longer than, the stab 206, which allows them to precede the stab 206 when the circuit breaker 200 is inserted in the panelboard 100. And the insertion keys 208a, 208b and the stab 206 are specifically positioned relative to each other on the circuit breaker 200 so they line up with the openings 106 in the device slot 104 when the circuit breaker 200 is inserted in the panelboard 100.

Figure 3:
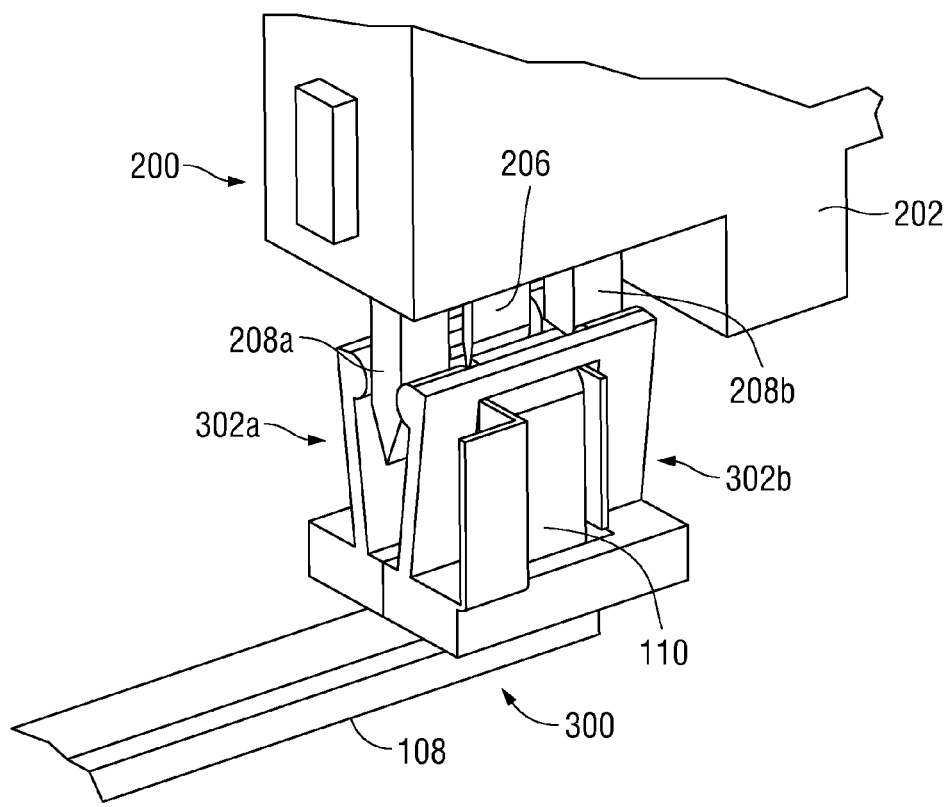
FIG. 3 shows an exemplary circuit breaker in a barrier interface according to one or more embodiments disclosed herein.

In accordance with the disclosed embodiments, the circuit breaker 200 may be inserted in a barrier interface 300 attachable to the panelboard 100 instead of directly in the panelboard 100, as shown in FIG. 3. Such a barrier interface 300 provides a protective interface between the panel cover 102 and the conductors 108 in the panelboard 100, allowing access to the conductors 108 only when the circuit breaker 200 is inserted in the barrier interface 300. As can be seen in FIG. 3, the barrier interface 300 is generally composed of two opposing frames 302a and 302b joined together to form a protective housing. These opposing frames 302a, 302b may be mounted over a plug-in jaw 110 or other terminal connected to the conductors 108 in the panelboard 100 to block or restrict access to the terminal. Each plug-in jaw 110 or other terminal in the panelboard 100 may have a separate barrier interface 300, or it is possible for several such terminals to share one barrier interface 300. When the circuit breaker 200 is inserted in the barrier interface 300, the insertion keys 208a, 208b on the circuit breaker 200 pry apart the opposing frames 302a, 302b of the barrier interface 300, thereby exposing the plug-in jaw 110 to receive the stab 206 of the circuit breaker 200.

Figure 4A:
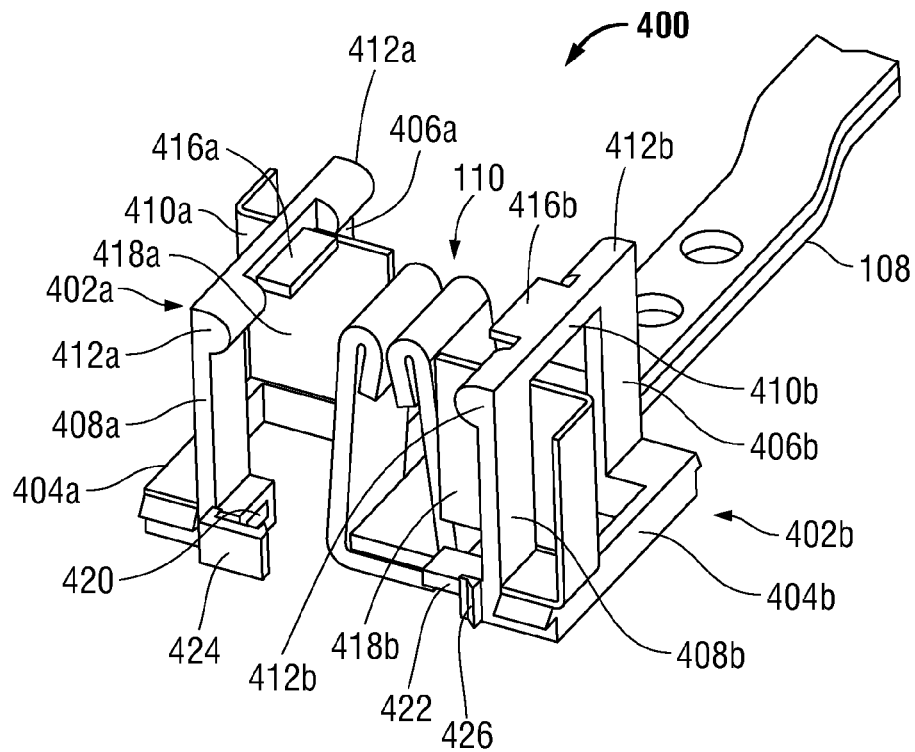
FIGS. 4A and 4B show an exemplary barrier interface according to one or more embodiments disclosed herein.
Figure 4B:
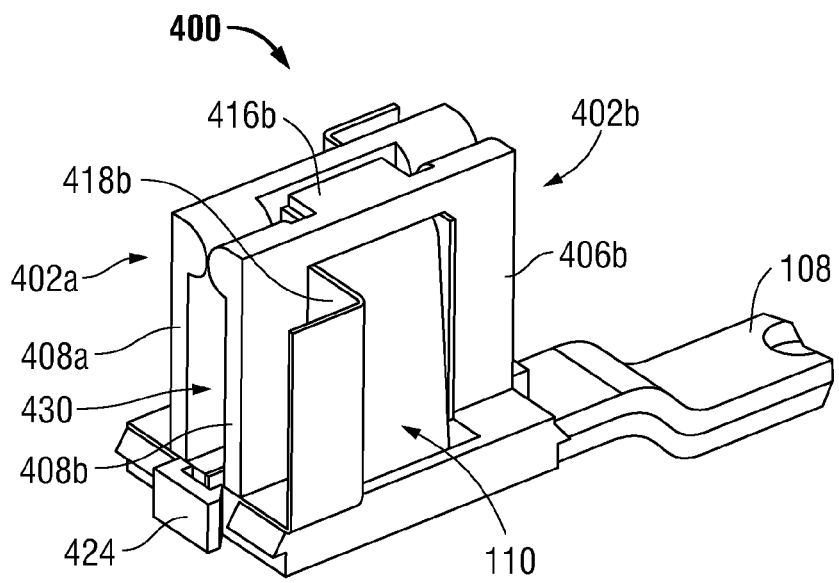

The plug-in jaw 110 and the conductors 108 connected thereto may be better seen in FIGS. 4A and 4B, which show another example of a barrier interface at 400. For ease of viewing, FIG. 4A shows the barrier interface 400 in a pre-assembled form, while FIG. 4B shows the barrier interface 400 as assembled. Referring first to FIG. 4A, the barrier interface 400 may again be composed of two opposing frames 402a, 402b joined together to form a protective housing around the plug-in jaw 110. The two opposing frames 402a, 402b may be made mostly or entirely of a nonconductive plastic or other material that has a resilient or spring like characteristic. The resilient or spring like characteristic allows the frames 402a, 402b to return substantially to their original form after being flexed or deformed. Each frame includes a base 404a and 404b, two nearly identical risers 406a & 408a and 406b & 408b extending substantially perpendicularly from the base 404a, 404b on opposite sides thereof, and a guard beam 410a and 410b resembling a horizontal bar connecting the ends of the risers together. This design gives each frame a substantially rectangular shape that may be sized to enclose the plug-in jaw 110 when the frames 402a, 402b are joined together.

Referring still to FIG. 4A, each frame 402a, 402b has a generally rectangular shield plate 416a and 416b near the middle of the guard beam 410a, 410b. The shield plates 416a, 416b extend toward one another so the shield plate of one frame 402a, 402b overlap the shield plate of the opposing frame when the two frames 402a, 402b are coupled together. When the shield plates 416a, 416b overlap in this manner, they are positioned directly over the top of the plug-in jaw 110 in the panelboard 100. This prevents access to the plug-in jaw 110, and the barrier interface 400 is considered to be in a closed position. To access the plug-in jaw 110, the guard beams 410a, 410b are pushed back from each other enough to separate the shield plates 416a, 416b so they no longer overlap. The separation of the shield plates 416a, 416b exposes the plug-in jaw 110, putting the barrier interface 400 in an open position.

Pushing the guard beams 410a, 410b back from each other may be done by inserting the circuit breaker 200 in the barrier interface 400. As mentioned earlier, the circuit breaker 200 has one or more insertion keys 208a, 208b on the underside of its casing 202. The insertion keys 208a, 208b are positioned on the circuit breaker 200 such that when the circuit breaker 200 is inserted in the barrier interface 400, the keys line up between the guard beams 410a, 410b of the opposing frames 402a, 402b. As the circuit breaker 200 is inserted in the barrier interface 400, the insertion keys 208a, 208b push apart the guard beams 410a, 410b, thereby separating the shield plates 416a, 416b and allowing the stab 206 to pass into the barrier interface 400 and enter the plug-in jaw 110.

In some embodiments, the guard beams 410a, 410b may be provided with rounded or sloped engagement surfaces 412a and 412b to facilitate insertion of the circuit breaker 200. In the example here, the rounded or sloped engagement surface may be in the form of semi-cylindrical protrusions 412a and 412b provided on each guard beam 410a, 410b. These semi-cylindrical protrusions 412a, 412b may be disposed near each end of each guard beam 410a, 410b where the insertion keys 208a, 208b contact the guard beams. The semi-cylindrical protrusions 412a, 412b extend in the same direction as the shield plates so the semi-cylindrical protrusion 412a on one guard beam 410a abuts or almost abuts the semi-cylindrical protrusion 412b on the other guard beam 410b when the frames 402a, 402b are joined together.

In addition to the shield plates 416a, 416b blocking access to the top of the plug-in jaw 110, in some embodiments, the barrier interface 400 may also include side shields 418a and 418b that block access to the sides of the plug-in jaw 110. As depicted in FIG. 4B, when the barrier interface 400 is assembled, the risers 406a & 408a and 406b & 408b may leave a gap between opposing risers, indicated at 430, that exposes the sides of the plug-in jaw 110. Therefore, each frame may be provided with a generally rectangular side shield 418a, 418b extending from the base 404a, 404b substantially perpendicularly to the frame 402a, 402b inside the frame adjacent to one of the risers. The side shields 418a, 418b of opposing frames 402a, 402b are disposed adjacent to opposite risers so when the frames 402a, 402b are joined together, one of the side shields 418a blocks access to one side of the plug-in jaw 110, while the other side shield 418b blocks access to the other side of the plug-in jaw 110.

To facilitate joining the frames 402a, 402b together, a guide mechanism is provided on the barrier interface 400 in some embodiments to ensure proper positioning of the frames 402a, 402b relative to one another. In the example shown, each base 404a, 404b may be provided with a guide slot 420 at one end of the base and a guide post 422 at the opposite end of the base. The guide slot 420 of one base, here 404a, has a size and shape that allows it to receive the guide post 422 of the complementary base, here 404b. As well, the locations of the guide slot 420 and guide post 422 on one base 404a are the reverse of the locations of the guide slot 420 and guide post 422 on the complementary base 404b. As a result, the guide slots 420 and the guide posts 422 align with each other only when the frames 402a, 402b are properly positioned relative to each other. Of course, other guide mechanisms beside guide slots and guide posts may be used without departing from the scope of the disclosed embodiments.

Once joined, a coupling mechanism, such as a latch, may be provided on the barrier interface 400 in some embodiments to hold the bases 404a, 404b together. In the present example, each base 404a, 404b may be provided with a latch 424 at one end of the base and a ridge 426 at the opposite end of the base. The latch 424 of one base 404a is designed to latch on to the ridge 426 of the other base 404b, and vice versa. Thus, the locations of the latch 424 and ridge 426 on one base 404a are the reverse of the latch 424 and ridge 426 on the other base 404b. This allows the latch 424 of one base to latch on to the ridge 426 of its complementary base.

In general operation, the motion of inserting the circuit breaker 200 (which is usually off) into barrier interface 400 pushes the insertion keys 208a, 208b on the circuit breaker 200 between opposing engagement surfaces 412a, 412b of the guard beams 410a, 410b and forces the guard beams apart. As the guard beams 410a, 410b separate, they carry the shield plates 416a, 416b away from one another so the plates no longer overlap. This leaves a gap for the stab 206 of the circuit breaker 200 to enter and contact the plug-in jaw 110. Removing the circuit breaker 200 (which is usually off) from the panelboard 100 allows the guard beams 410a, 410b and the shield plates 416a, 416b to come back together due to the resiliency of the frames 402a, 402b.

Figure 5A:
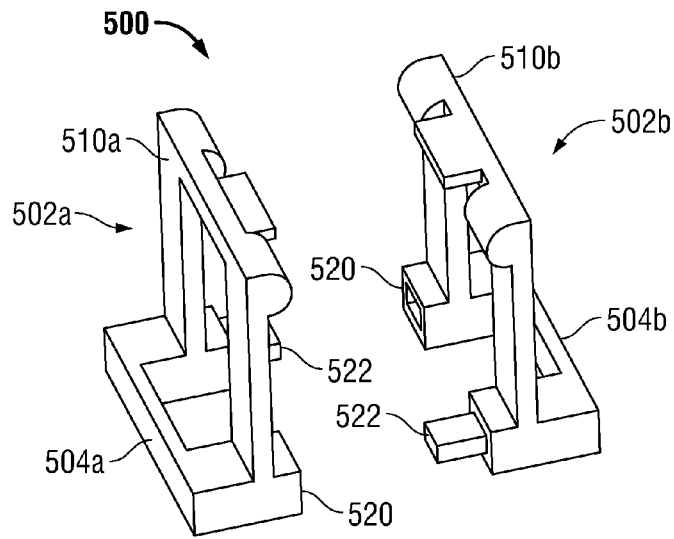
FIGS. 5A and 5B show another exemplary barrier interface according to one or more embodiments disclosed herein.
Figure 5B:
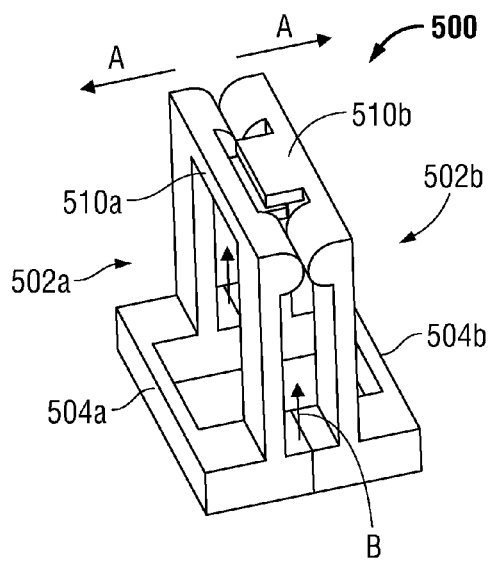

Referring now to FIGS. 5A and 5B, in some embodiments, rather than having a separate coupling mechanism, the barrier interface may rely on the guide slots and guide posts mentioned above to hold the bases together. As can be seen in FIG. 5A, a barrier interface 500 according to these embodiments has many of the same components as the barrier interface 400 of FIG. 4. However, instead of a latch or similar coupling mechanism, the barrier interface 500 uses the guide slots 520 and the guide posts 522 to hold the bases 504a, 504b together. As can be seen in FIG. 5B, when the guard beams 510a, 510b are pushed back by insertion of the circuit breaker, as indicated by the arrows labeled "A," torque is generated between the guide slots 520 and the guide posts 522, as indicated by the arrows labeled "B." The torque along with normal friction between the guide slots 520 and the guide posts 522 help hold the bases 504a, 504b together, thus obviating the need for a separate coupling mechanism. Note that this barrier interface 500 also does not include the side shields discussed above, although the side shields may certainly be added as needed.

Figure 6:
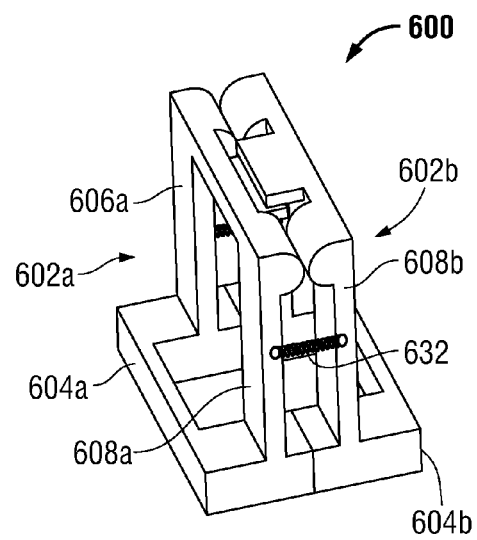
FIG. 6 shows yet another exemplary barrier interface according to one or more embodiments disclosed herein.

In some embodiments, depending on the material used, the barrier interface may lose some of the spring like characteristics over time and/or with repeated deformations. This loss of resiliency may cause the barrier interface not to function properly because the frames may fail to return the shield plates to their overlapping position. To mitigate any loss of resiliency, the barrier interface may be provided with a spring or other biasing mechanism between the opposing frames of the interface. FIG. 6 shows an example of such a barrier interface at 600. The barrier interface 600 has many of the same components as the barrier interface 500 discussed above with respect to FIGS. 5A and 5B. However, this barrier interface 600 further includes a spring 632 or other biasing mechanism mounted between opposing risers 606a & 608a and 606b & 608b near the middle of the risers. The spring 632 helps pull the opposing frames 602a, 602b of the barrier interface 600 back to their original position after being deformed. This helps prevent or delay any resiliency loss by the frames 602a, 602b. Any suitable spring 632 or similar biasing mechanism may be used without departing from the scope of the disclosed embodiments. It is also possible to mount the spring 632 at another location on the barrier interface 600 besides the risers, for example, on the semi-cylindrical protrusions.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the disclosed embodiments as defined in the appended claims.

What is claimed is:

1. A safety system for an electrical panelboard, comprising:
   a plug-in jaw in the panelboard, the plug-in jaw electrically connected to conductors in the panelboard;
   a barrier interface disposed over the plug-in jaw, the barrier interface operable to allow access to the plug-in jaw when the barrier interface is open and to block access to the plug-in jaw when the barrier interface is closed; and
   a circuit breaker having a terminal that is pluggable in the plug-in jaw and one or more insertion keys extending parallel to the terminal, the one or more insertion keys positioned on the circuit breaker to force the barrier interface open when the circuit breaker is inserted in the panelboard.

2. The safety system of claim 1, wherein the barrier interface comprises opposing frames that form a protective housing over the plug-in jaw when the frames are coupled together.

3. The safety system of claim 2, wherein at least a portion of each frame is made of a nonconductive resilient material.

4. The safety system of claim 2, wherein each frame comprises a base, two risers extending substantially perpendicularly from the base at opposite sides thereof, and a guard beam connecting the two risers together.

5. The system of claim 4, wherein the base of each frame includes a guide slot and a guide post, the guide slot on the base of one frame configured to receive the guide post on the base of the opposing frame, and vice versa.

6. The safety system of claim 4, wherein the base of one frame is held to the base of the opposing frame while the guard beam of each frame remains movable when the frames are coupled together.

7. The system of claim 6, wherein the base of each frame is held to the base of the opposing frame by a latch mechanism.

8. The system of claim 4, wherein each frame further comprises a shield plate extending from each guard beam substantially perpendicularly relative to the risers, the shield plate of one guard beam overlapping the shield plate of the opposing guard beam when the barrier interface is closed.

9. The system of claim 4, wherein each guard beams includes a sloped engagement surface disposed on one end thereof.

10. The system of claim 8, wherein the one or more insertion keys of the circuit breaker are positioned to contact the sloped engagement surface of each guard beam when the circuit breaker is inserted in the panelboard.

11. The system of claim 2, wherein each frame comprises a side shield disposed substantially perpendicular to the frame, the side shield positioned within the frame to block a side access to the plug-in jaw.

12. The system of claim 2, wherein the barrier interface comprises a biasing mechanism mounted between the frames, the biasing mechanism configured to bias the frames toward each other.

13. A safety system for an electrical panelboard, comprising:
   a connector site in the panelboard, the connector site electrically connected to conductors in the panelboard;
   a barrier interface disposed over the connector site, the barrier interface operable to allow access to the connector site when the barrier interface is open and to block access to the connector site when the barrier interface is closed; and
   a circuit breaker having a terminal that is connectable at the connector site and one or more insertion keys extending parallel to the terminal, the one or more insertion keys positioned on the circuit breaker to force the barrier interface open when the circuit breaker is inserted in the panelboard.

* * * * *